United States Patent [19]

Odagawa et al.

[11] Patent Number: 4,910,459
[45] Date of Patent: Mar. 20, 1990

[54] MAGNETIC TILE SENSOR WITH A NON-MAGNETIC CASE HAVING A FLANGE AND A COVER COLD WELDED THEREON

[75] Inventors: Yoshimoto Odagawa; Yasushi Yanagisawa; Takashi Shioura; Imaizumi Hiraku; Akira Morita, all of Chiba, Japan

[73] Assignee: TDK Corporation, Tokyo, Japan

[21] Appl. No.: 290,249

[22] Filed: Dec. 23, 1988

[30] Foreign Application Priority Data

Dec. 26, 1987 [JP] Japan .................. 62-328279
Dec. 26, 1987 [JP] Japan .............. 62-196630[U]
Jul. 13, 1988 [JP] Japan .................. 63-172541
Jul. 13, 1988 [JP] Japan ............... 63-91838[U]
Jul. 13, 1988 [JP] Japan ............... 63-91839[U]

[51] Int. Cl.$^4$ ............................................. G01B 7/14
[52] U.S. Cl. ........................ 324/207.13; 324/262; 33/364
[58] Field of Search ............... 324/207, 208, 226, 228, 324/234, 235, 236, 239, 243, 244, 259-262, 345-346; 33/364

[56] References Cited

U.S. PATENT DOCUMENTS

| | | | |
|---|---|---|---|
| 3,253,099 | 5/1966 | Hess | 324/228 X |
| 3,305,805 | 2/1967 | Tann | 324/228 X |
| 4,282,484 | 8/1981 | Morrow | 324/226 X |
| 4,371,836 | 2/1983 | Nickel et al. | 324/207 |
| 4,517,514 | 5/1985 | Howell | 324/207 |
| 4,694,247 | 9/1987 | Meili et al. | 324/262 X |

Primary Examiner—Gerard R. Strecker
Assistant Examiner—Warren S. Edmonds
Attorney, Agent, or Firm—Burgess, Ryan & Wayne

[57] ABSTRACT

A magnetic tile sensor has a permanent magnet having a surface coated with a magnetic fluid and housed in a hollow portion of a nonmagnetic case, and a magnetic sensing element arranged outside the bottom portion of the case. When the case is tilted or is abruptly moved, the permanent magnet in the case is relatively displaced. The magnetic sensing element detects this displacement. Since the nonmagnetic case is sealed by a cold welding method, workability and reliability can be increased. In addition, a cap having a predetermined weight covers the permanent magnet so that a response characteristic is improved.

10 Claims, 11 Drawing Sheets

F I G. 5 A
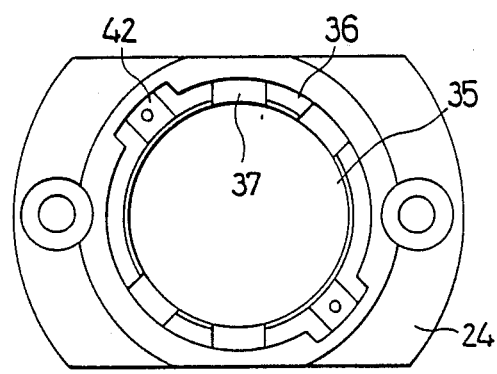
F I G. 5 B
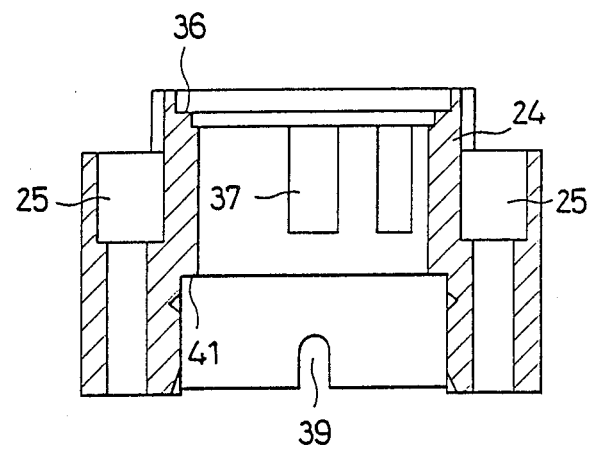
F I G. 5 C
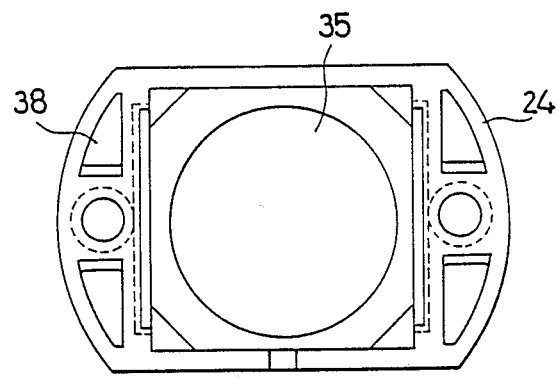

MAGNETIC TILE SENSOR WITH A NON-MAGNETIC CASE HAVING A FLANGE AND A COVER COLD WELDED THEREON

BACKGROUND OF THE INVENTION:

I. Field of the Invention

The present invention relates to a tilt sensor for detecting the presence/absence of a tilt or an acceleration of an object when the object is tilted or vibrated at a lateral acceleration.

II. Description of the Prior Art

According to a proposed tilt sensor, a permanent magnet having a surface coated with a magnetic fluid is housed in a hollow case, and a magnetic sensing element is arranged outside the case (U.S. Ser. No. 112,626 and E.P.C. application Ser. No. 87115618.8). With this arrangement, the permanent magnet is moved to a lower position by its own weight when the case is tilted. As a result, magnetism detected by the magnetic sensing element is changed, and hence the tilt sensor detects that the case is tilted.

FIG. 15 shows a tilt sensor of this type. Reference numeral 1 denotes a nonmagnetic case made of aluminum. A cup-like case main body 1a and a cover 1b of the case 1 are bonded to each other by an adhesive applied between overlapped portions thereof, so that the case 1 has a sealed hollow portion 2. A substantially disk-like permanent magnet 4 having a surface coated with a magnetic fluid 3 is housed in the hollow portion 2. Note that reference numeral 1c denotes a small hole through which the magnetic fluid 3 is injected into the case 1 after the permanent magnet 4 is placed in the case 1 and the case main body 1a and the cover 1b are bonded to each other by the adhesive. After the injection of the magnetic fluid 3, the small hole 1c is sealed. Reference numeral 5 denotes a sensor mounting base consisting of a plastic molded member. The case 1 is inserted in an upper portion of the mounting base 5 and is fixed thereto by a resin 6. Reference numeral 7 denotes a reed switch as a magnetic sensing element arranged on a printed board 8 and having soldered lead terminals. Leads 9 extend from the printed board 8. Reference numeral 10 denotes a lower cover fixed to the mounting base 5 by engaging pawls 10a protruding from a pair of opposite sides of the cover 10 with recesses formed in the inner wall of the mounting base 5; and 11, an amorphous magnetic piece bonded to the top portion of the mounting base 5. The response angle of the tilt sensor is adjusted by a position where the amorphous magnetic piece 11 is bonded. Reference numeral 12 denotes a label on which the name, a model number, the name of a manufacturer, and the like of a tilt sensor are displayed.

In such an arrangement, while the case 1 is not tilted, the permanent magnet 4 is located at a central portion of the case 1. Since a pair of lead terminals of the reed switch 7 are equally influenced by the magnetism of the permanent magnet 4, they are polarized to the same pole at a central portion of the switch 7 and repulse each other. As a result, the switch 7 is set in an open state. When the case 1 is tilted, the permanent magnet 4 is moved to a lower position, and only one lead terminal is influenced by the magnet 4. As a result, the lead terminals are polarized to the opposite poles at the central portion of the switch 7, and hence the switch 7 is set in a connected state. Note that the magnetic fluid 3 serves as a lubricating oil when the permanent magnet 4 is moved. In this manner, a tilt of the case 1 can be detected by an opening/closing operation of the reed switch 7.

In the prior art having the above-described arrangement, however, the following problems are posed.

(1) As described above, the nonmagnetic case 1 is designed such that the permanent magnet 4 is placed in the cup-like case main body 1a, and the case main body 1a and the cover 1b coated with the adhesive, which is applied at the overlapped portions in advance, are engaged with each other to be bonded. Then, after the magnetic fluid 3 is injected through the small hole 1c formed in the cover 1b, the small hole 1c is sealed. An adhesive is also used at this time. The case 1 sealed in this manner is inserted from an opening of a bottom portion of the mounting base 5. The resultant structure is then turned upside down, and the resin 6 is supplied therein, so that the case 1 is fixed to the base 5 by curing the resin 6. The adhesive and resin must be thermally cured upon each operation. In addition, a two-part liquid type adhesive which is not affected by the magnetic fluid 3 is used as the adhesive. Therefore, the manufacture of the sensor requires a long total manufacturing time including a time required for preparation of the adhesive, and the yield is greatly decreased.

(2) After the case 1 is fixed to the upper portion of the mounting base 5, the printed board 8 having the reed switch 7 mounted thereon is inserted in the base 5. The printed board 8 is then positioned by a stopper (not shown) and is fixed by fitting the lower cover 10 in the base 5. A distance between the permanent magnet 4 and the reed switch 7 formed at this time greatly influences the response angle of the tilt sensor. In the arrangement shown in FIG. 15, a mounting position of the case 1 varies depending on the bonded state of the cup-like case main body 1a and the cover 1b, the sealed state of the small hole 1c, the fixed state of the case 1 by the resin 6, and the like. In addition, if the adhesive overflows and a projection is formed, a gap is formed between the cover 1b and the ceiling of the mounting base 5. Hence, the response angle tends to vary.

(3) The permanent magnet 4 housed in the case 1 must have a certain weight so as to increase the response speed with respect to a tilt. This is because as a weight W is increased, a component of force $W\sin\alpha$ for moving the magnet 4 along a tilted bottom surface of the case 1 when the case 1 is tilted at an angle $\alpha$ is increased. As a result, the component of force $W\sin\alpha$ can overcome various forces for blocking the movement of the magnet 4, such as an attraction between the magnet 4 and the of the reed switch 7 and the viscosity and surface tension lead terminals of the magnetic fluid 3.

In addition, the magnetic fluid 3 serves as a lubricating oil upon movement of the permanent magnet 4. More specifically, since the magnet 4 attracts the magnetic fluid 3, the fluid 3 flows into a space between the magnet 4 and the bottom surface of the case 1 and adheres thereto. This adhesive force serves as a force for flowing the permanent magnet 4. Consequently, the magnet 4 is moved in response to a tilt or vibrations of the case 1 while it is floated from the bottom surface of the case 1. Since a frictional resistance upon movement of the magnet 4 is generated only between the fluid 3 and the bottom surface of the case 1, it is very small. Although the magnetic fluid 3 is required only between the magnet 4 and the bottom surface of the case 1, the fluid 3 actually adheres to the permanent magnet 4 so as to cover its entire surface. The fluid 3 adhering to upper and side surfaces of the magnet 4 is unnecessary.

(4) When the reed switch 7 is arranged to be perpendicular to the bottom surface of the case 1, a distance between the bottom surface of the case 1 and the lead terminals of the reed switch 7 sensitively affects the sensitivity of the tilt sensor or a tilt angle at which the reed switch 7 responds. Therefore, by adjusting this distance, the sensitivity and the response angle can be adjusted. In the prior art, threads are formed in the outer circumference of a hold member for holding the reed switch and in the inner circumferential surface of the mounting base, which is brought into contact with the outer circumferential surface of the hold member, so as to be meshed with each other, and the hold member is pivoted to be vertically moved, thereby performing the adjustment.

Such a thread arrangement, however, undesirably increases the manufacturing cost.

(5) Since the tilt sensor incorporates the permanent magnet and the magnetic sensing element, if an instrument or a circuit susceptible to magnetic influences is present around the tilt sensor, it is influenced by a magnetic field generated by the tilt sensor. Furthermore, in contrast with this, if an external magnetic field is present near the tilt sensor, the magnetic sensing element may be erroneously operated. Therefore, the tilt sensor must be magnetically shielded from its surroundings.

SUMMARY OF THE INVENTION:

The present invention has been made to solve the above-described problems.

It is a first object of the present invention to provide a tilt sensor which can be manufactured without employing a scheme of sealing a nonmagnetic case with an adhesive so as to greatly decrease the total manufacturing time and reduce variations in the manufactured product.

In order to achieve the first object, a cold welding method is employed as a sealing method of the nonmagnetic case. More specifically, a nonmagnetic metal which can be processed by cold welding is used for the nonmagnetic case, a cup-like case main body has a flange portion extending outward from its opening edge, a cover includes a bent protrusion arranged in the form of a ring along the inner wall of the opening of the cup-like case main body and having a U-shaped section, and a flange extending from the protrusion outward. The case main body and the cover are welded to each other by welding cold.

According to the cold welding method, metal members can be welded to each other only by pressure without heating, and a highly reliable sealing state of the case can be realized. Therefore, productivity can be greatly increased compared with the conventional adhesive coating and heat curing processes.

It is a second object of the present invention to provide a tilt sensor in which a method of mounting a nonmagnetic case on a mounting base is improved so as to greatly decrease the total manufacturing time and to reduce variations in product.

In order to achieve the second object, a nonmagnetic case has a flange on the same plane as that of a cover. In addition, a mounting base includes a mounting portion having upper and lower openings communicating with each other. With this arrangement, the nonmagnetic case is inserted from the upper portion of the mounting portion, and positioning of the case is performed by placing the flange of the case on a stage formed near the upper edge of the mounting portion.

Since the nonmagnetic case has the above-described shape, the case can be mounted from above the mounting base. Hence, workability is greatly improved. In addition, since a mounting position of the case is stabilized, a distance between the permanent magnet and the reed switch can be made constant, thereby eliminating variations in response angle of the tilt sensor.

It is a third object of the present invention to provide a tilt sensor in which a required weight is added to a permanent magnet so as to increase a response speed with respect to a tilt, and adhesion of an unnecessary magnetic fluid is prevented.

In order to achieve the third object, a cap having a required weight is covered on a permanent magnet housed in a case. In addition, the cap is constituted by a magnetic member, and the cap is shaped so as to cover most of portions from the upper surface to the side surfaces near the bottom surface of the permanent magnet.

By adding a required weight to the permanent magnet, a response speed with respect to a tilt can be increased. In addition, the cost can be reduced by decreasing an amount of magnetic fluid adhering to an unnecessary portion of the permanent magnet. If the cap is constituted by a nonmagnetic member, the cap functions as a yoke. As a result, magnetic fluxes are concentrated on the bottom surface portion of the permanent magnet, and leaking magnetic fluxes are greatly decreased, so that magnetic influences on the magnetic sensing element are increased. As a result, the size of the tilt sensor can be reduced.

It is a fourth object of the present invention to provide a tilt sensor in which a distance between a case and a reed switch is adjusted without employing a thread arrangement and the cost can be decreased.

In order to achieve the fourth object, the outer circumferential surface of a hold member for holding a magnetic sensing element and the inner circumferential surface of a mounting base have sizes to allow fitting and sliding movement with each other, a groove is formed in the hold member in its circumferential direction, and an adjustment window is formed in a body portion of the mounting base. With this arrangement, the hold member is vertically moved through the adjustment window so as to adjust a distance between the case housing the permanent magnet and the hold member.

A pin or the like is inserted from the adjustment window formed in the body portion of the mounting base, and the pin is hooked on the groove formed in the hold member in its circumferential direction so as to operate the hold member. With this operation, the hold member can be easily moved vertically. Upon completion of adjustment of a required response angle, the hold member is fixed to the mounting base by fusion bonding.

It is a fifth object of the present invention to provide a tilt sensor which is magnetically shielded from its surroundings.

In order to achieve the fifth object, a magnetic shield is formed so as to cover a required portion.

By forming the magnetic shield, influences of an internal magnet on the outside and influences of an external magnetic field on the inside can be eliminated. Therefore, no limitation is posed in terms of an installation place of the tilt sensor. In addition, the detection precision of the tilt sensor can be increased.

BRIEF DESCRIPTION OF THE DRAWINGS:

FIGS. 5A, 5B, and 5C are a plan view, a sectional view, and a bottom view, respectively, showing a mounting base;

Figure 1A:
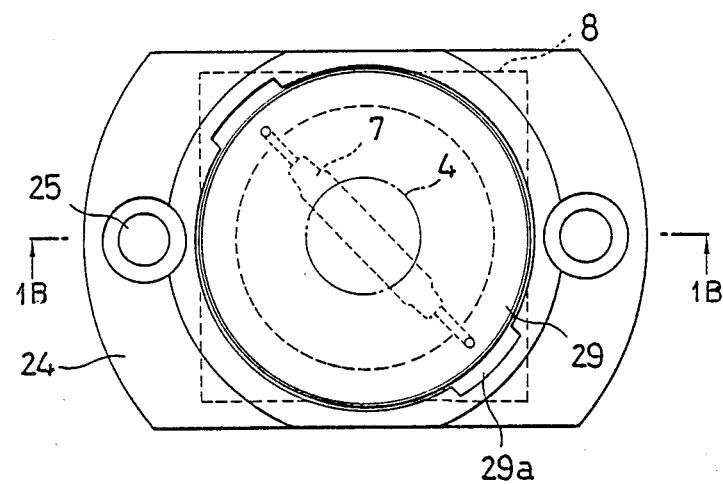
FIG. 1A is a plan view showing a magnetic tilt sensor according to an embodiment of the present invention.
Figure 1B:
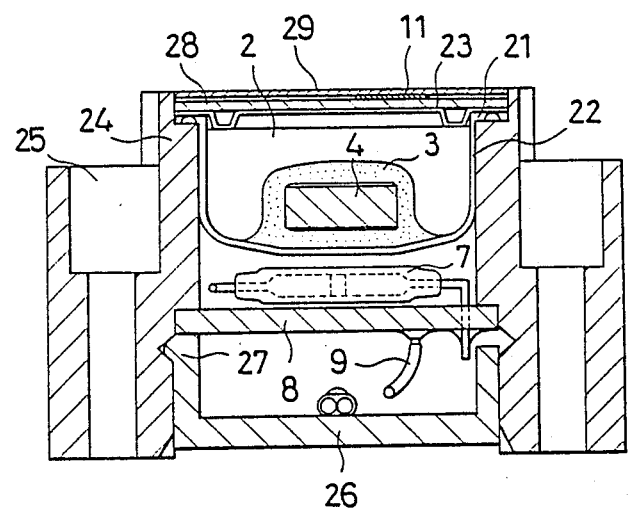
FIG. 1B is a sectional view taken along the line X—X in FIG. 1A.
Figure 2:
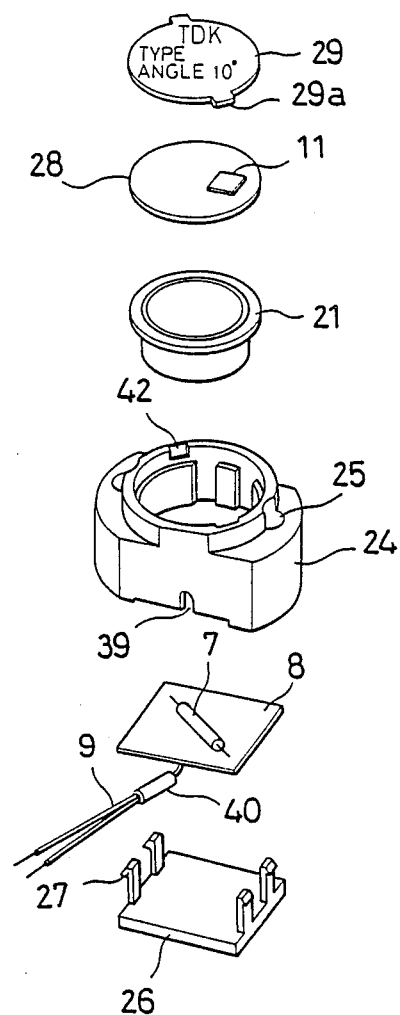
FIG. 2 is an exploded perspective view of FIGS. 1A and 1B.

DETAILED DESCRIPTION OF THE PREFERRED EMBODIMENTS:

FIGS. 1A and 1B show an embodiment of the present invention. FIG. 1B is a sectional view taken along the line X—X in FIG. 1A. FIG. 2 is an exploded perspective view of FIGS. 1A and 1B. Note that a magnetic fluid 3, a permanent magnet 4, a reed switch 7, a printed board 8, leads 9, and an amorphous magnetic piece 11 are the same as those used in the prior art.

Reference numeral 21 denotes a nonmagnetic case, constituted by a cup-like case main body 22 and a cover 23 both of which are made of aluminum, for housing the permanent magnet 4, to which the magnetic fluid 3 adheres, in a hollow portion 2; 24, a mounting base constituted by a plastic molded member and including a mounting portion having upper and lower openings communicating with each other; 25, a tilt sensor mounting screw holes formed in the mounting base 24; 26, a lower cover constituted by a plastic molded member and including engaging pawls 27 protruding from its opposite sides; 28, an intermediate cover made of aluminum, to which the amorphous magnetic piece 11 is bonded; and 29, a label plate with an adhesive constituted by an anodized aluminum member, on which the name, a model number, the name of a manufacturer and the like of a tilt sensor are displayed.

Figure 3:
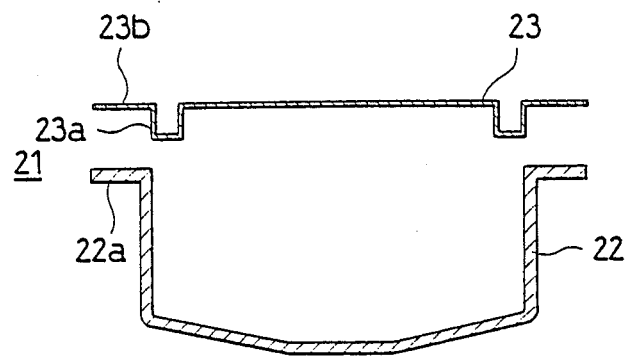
FIG. 3 is a sectional view showing a shape of a nonmagnetic case.
Figure 4A:
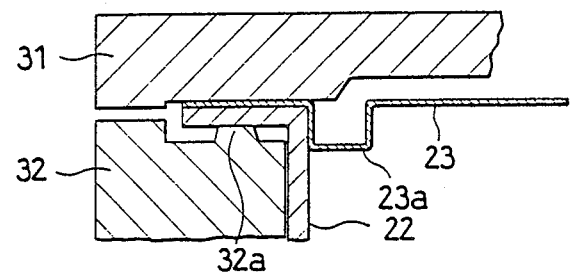
FIGS. 4A, 4B, and 4C are sectional views showing a welding process of a cup-like case main body and a cover by a cold welding method.
Figure 4B:
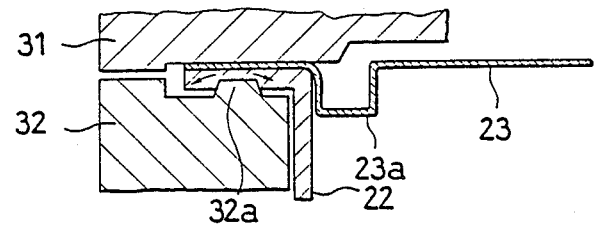
Figure 4C:
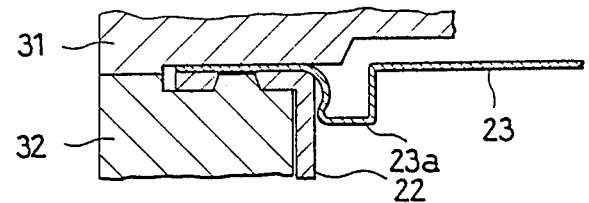

According to one of the characteristic features of the present invention, a nonmagnetic metal which can be processed by cold welding is used as a material of the nonmagnetic case 21, so that the cup-like case main body 22 and the cover 23 are welded to each other and sealed by cold welding at their flanges. In this embodiment, aluminum is used as the material. FIG. 3 shows a shape of the case 21. FIGS. 4A to 4C respectively show the cold welding method. Copper, a copper alloy, nonmagnetic stainless steel, or the like may be used as a material of the nonmagnetic case instead of aluminum.

As shown in FIG. 3, the cup-like case main body 22 includes a flange 22a extending outward from its opening edge, whereas the cover 23 includes a bent protrusion 23a, which is formed along the inner wall of the opening of the cup-like case main body 22 and has a substantially U-shaped section, and a flange 23b formed outside the protrusion 23a. When the cover 23 is fitted on the cup-like case main body 22, the outer circumferential surface of the protrusion 23a is loosely inserted in the case main body 22 along the inner wall of its opening. As a result, the case main body 22 and the cover 23 are positioned and both the flanges 22a and 23b overlap each other.

The principle of the cold welding method will be described with reference to FIGS. 4A to 4C.

The cold welding method is a known technique employed as a sealing method of a quartz oscillator. In this case, however, an oxygen-free copper having a nickel-plated surface or a cold-rolled iron material having underlying gold plating and finished with nickel plating is often used as a welded metal. In this embodiment, pure aluminum is used. The cup-like case main body 22 and the cover 23 are annealed and degreased in advance. After the permanent magnet 4 and the magnetic fluid 3 are placed in the case main body 22, the cover 23 is fitted on the case main body 22. Thereafter, the flanges are clamped by upper and lower molds 31 and 32, as shown in FIG. 4A. The lower mold 32 has a projection 32a having a trapezoidal section and formed at a position corresponding to a welded portion. When the molds are pressed by a hydraulic press or the like, the projection 32a cuts into the flange 22a, and the metal at the flange 22a is fluidized as shown in the arrows in FIG. 4B. At this moment, both the flanges are welded to each other. In this case, the metal fluidized at the cover 23 side is absorbed by the deformation of the protrusion 23a, as shown in FIG. 4C. Hence, this fluidized metal does not cause deformation of the cover as a whole. A nonmagnetic case 21 welded in this manner was heated at 125° C. for 30 minutes, and was then dipped in a fluorinert solution available from Sumiton° 3m Company for five minutes so as to check the present/absence of air cells. In addition, after a sealing test using a vacuum heating test or the like, it was confirmed that the seal of case 21 was perfect.

In a sealing process using this cold welding method, no heat is used and welding can be performed within a very short time of 20 to 30 sec/product. If an automatic apparatus is used, the process time can be further shortened. In addition to a decrease in preparation time, this method can greatly decrease the total manufacturing time as compared with the conventional method of using an adhesive, which requires a curing time of 1 hour×2 times=2 hours or more. In addition, reliability is greatly increased, and variations in working can be decreased, thereby providing tremendous effects.

In another improvement, the nonmagnetic case 21 can be mounted on the mounting base 24 from its upper portion because of the flange of the case 21. FIGS. 5A to 5C show the mounting base 24 including the mounting portion 35 having the lower and upper opening communicating with each other. A step 36 is formed near the upper edge of the mounting portion 35. The flange 22a of the case 21 is placed on the step 36 so as to perform perfect positioning of the case 21. The flange 22a and the step 36 are bonded and fixed to each other by a thermosetting adhesive. However, since this adhesive has nothing to do with sealing of the case 21, a cold-setting adhesive may be used. Recesses 37 are formed in the inner wall of the mounting portion 35 at its unnecessary portions, and hollow portions 38 are formed in the lower surface of the mounting base 24, thereby decreasing the thickness of mounting base 24 and saving the material. Note that recesses are formed in the mounting base 24 at portions where the lead terminals of the reed switch 7 extend, thus providing reliefs.

Reference numeral 39 denotes a notched portion formed in a lower side wall of the mounting portion 35. A heat-shrinkable tube 40 covers leads extending from the printed board 8 at a proper position (refer to FIG. 2), and the tube 40 is pushed into the notched portion 39 so as to be fixed. In this case, the heat-shrinkable tube 40 serves as a criterion for determining the lengths of the leads to be extracted, and hence workability is improved. The bottom surfaces of the side wall having the notched portion therein and its opposite side wall are located slightly higher than the bottoms of the portions in which the mounting screw holes 25 are formed. Therefore, the mounting bottom surface of the tilt sensor becomes the bottoms of the portions in which the mounting screw holes 25 are formed. The tilt sensor can be more stably set to be horizontal by the two portions of the mounting base 24, i.e., both the ends in the longitudinal direction than a structure having a bottom surface located within a single plane.

The printed board 8 is inserted from below the mounting portion 35, and is positioned by a step 41. With this arrangement, a relative position between the printed board 8 and the case 21 positioned by the step 36 becomes constant, thereby eliminating variations in product. The printed board 8 is fixed to the distal ends of the engaging pawls 27 of the lower cover 26 fitted in the mounting portion 35 from therebelow.

Each mounting screw holes 25 is formed in two stages. With this arrangement, when mounting screws are inserted in the screw hole 25 to mount the tilt sensor on an object, the heads of the mounting screws are located at the large-diameter portions of the holes 25. As a result, the tip of a driver can be very easily engaged with the head of each mounting screw.

After the nonmagnetic case 21 is attached to the mounting portion 35 of the mounting base 24, the intermediate cover 28 is mounted on the case 21, as shown in FIG. 1B or 2. The amorphous magnetic piece 11 is bonded to the cover 28. The response angle of the tilt sensor is finally adjusted by the bonding position of this amorphous magnetic piece 11. Upon completion of the adjustment, the label plate 29 is bonded to the surface of the cover 28. Projections 29a are formed at two positions of the outer periphery of the label plate 29, whereas recesses 42 (refer to FIG. 5A) are formed at corresponding positions of the mounting base 24. With this arrangement, the bonding position of the label plate 29 is fixed, and hence workability is very improved compared with the conventional technique wherein a circular label is bonded upon positioning with the eye. In addition, if a label is used, the surface becomes undesirably uneven. However, as shown in the embodiment, by using the label plate, the surface becomes even, and hence a product value can be increased.

In the above embodiment, the reed switch is used as a magnetic sensing element. However, other elements may be used. In addition, the amorphous magnetic piece is used to adjust the response angle. However, the present invention is not limited to this. Any material having a large saturation magnetization, such as permalloy and silicon steel, may be used.

As described above, according to the embodiment, a nonmagnetic metal which can be processed by cold welding is used as a material for the nonmagnetic case, and the cup-like case main body and the cover are welded to each other at their flanges and sealed by cold welding. Therefore, the total manufacturing time can be greatly decreased, and reliability in sealing can be considerably increased. In addition, variations in product can be greatly reduced.

Furthermore, the nonmagnetic case having a flange is inserted in the mounting base, which has upper and lower openings communicating with each other, from the above, and the flange is mounted on a step formed on a mounting portion, thereby performing positioning of the case. With this arrangement, workability is greatly improved compared with the conventional technique wherein the case is inserted from below the mounting base and fixed by a resin. A relative position of the case and the magnetic sensing element is always kept constant, and hence variations in product can be greatly reduced. Moreover, a positioning means for forming the projections on the outer periphery of the label plate and attaching the label plate by fitting the projections in the corresponding recesses of the mounting base, a fixing means for fixing the leads extending from the magnetic sensing element to the notched portion formed on the side wall of the mounting base by covering the leads with the heat-shrinkable tube, and the arrangement of the two-stage mounting screw holes of the mounting base are respectively very effective in improving workability. By using the label plate, the problem of uneven surface can be solved. Since only the bottom surfaces of both the end portions of the mounting base in the longitudinal direction are brought into contact with an object, the tilt sensor can be stably set to be horizontal.

Figure 6:
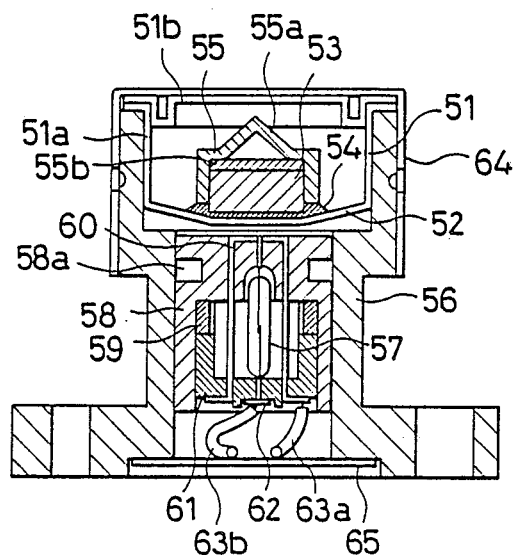
FIG. 6 is a sectional view of another embodiment of the present invention.
Figure 7A:
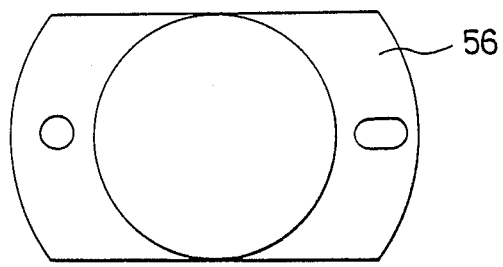
FIG. 7A is a plan view of the embodiment in FIG. 6.
Figure 7B:
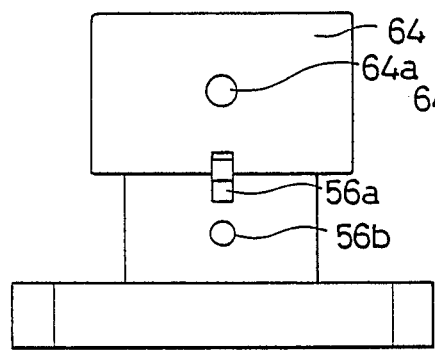
FIGS. 7B and 7C are side views of the embodiment in FIG. 6.
Figure 7C:
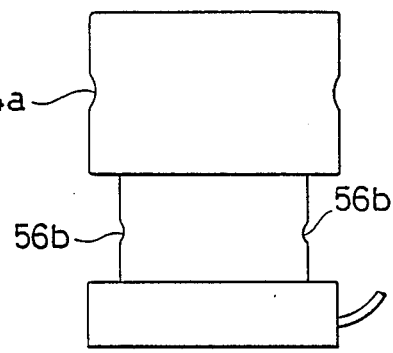
Figure 7D:
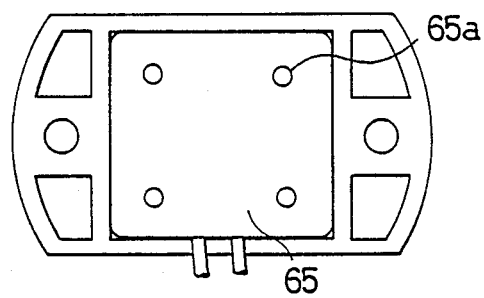
FIG. 7D is a bottom view of the embodiment in FIG. 6.
Figure 8:
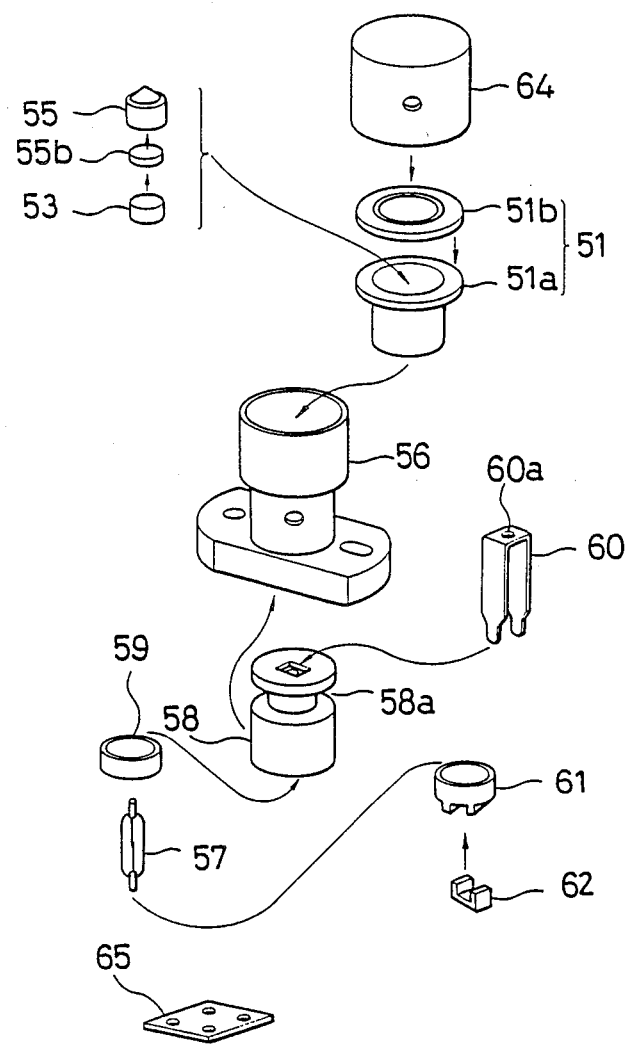
FIG. 8 is an exploded perspective view of the embodiment in FIG. 6.

FIG. 6 is a sectional view of another embodiment of the present invention. FIG. 7A, FIGS. 7B and 7C, and FIG. 7D are a plan view, side views, and a bottom view of the embodiment in FIG. 6, respectively. FIG. 8 shows each component. Referring to FIGS. 6 to 8, reference numeral 51 denotes a nonmagnetic case which is made of, e.g., aluminum, and comprises a case main body 51a and a cover 51b respectively having flanges air-tightly coupled to each other by a so-called cold welding; 52, a case bottom portion; and 53, a disk-like permanent magnet housed in the case 51. A cap 55 is mounted on the magnet 53. The cap 55 is made of a magnetic material and has a conical projection 55a at its top. A disk-like weight 55b may be arranged inside the cap 55 as needed. Reference numeral 54 denotes a magnetic fluid adhering to the bottom surface of the permanent magnet 53; and 56, a mounting base constituted by a resin molded member.

Reference numeral 57 denotes a reed switch, arranged and fixed outside the case bottom portion 52, for detecting the magnetism of the permanent magnet 53. The reed switch 57 is held by a switch holder 58, which is constituted by a resin molded member. In addition to the reed switch 57, the switch holder 58 holds an annular permanent magnet 59 which is arranged coaxially with the reed switch 57 and is magnetized so as to have a polarity direction opposite to that of the permanent magnet 53 in the case (the functions and effects of the permanent magnet 59 are described in U.S. Ser. No. 209,064 and E.P.C. application Ser. No. 88109937.8).

The reed switch 57 and the annular permanent magnet 59 are assembled in the switch holder 58 such that an upper terminal 60 is inserted in the switch holder 58 from the above, reed switch 57, the annular permanent magnet 59, and a lower holder 61 are inserted in the switch holder 58 from below, and then end portions of the upper terminal 60 are bent to be fixed. One lead terminal of the reed switch 57 is soldered to an upper hole 60a of the upper terminal 60, whereas the other lead terminal of the reed switch 57 is soldered to a lower terminal 62 arranged at a central portion of the bottom surface of the lower holder 61. Note that extraction leads 63a and 63b are respectively soldered to the bent portions of the upper terminal 60 and the lower terminal 62.

Reference numeral 64 denotes a shield case fitted on the mounting base 56 from above so as to cover the overall case 51; and 65, a shield plate mounted on a bottom portion of the mounting base 56 so as to cover a lower portion of the reed switch 57.

Figure 9:
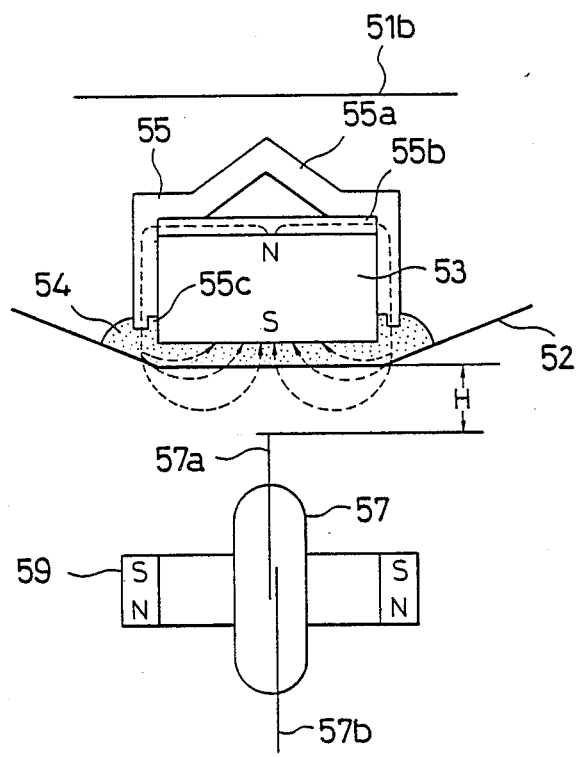
FIG. 9 is a view illustrating functions of a cap.

As shown in FIG. 9, the cap 55 mounted on the permanent magnet 53 has a shape covering most of the portions from the upper surface to the side surfaces near the bottom surface of the magnet 53. A slight gap 55c is preferably formed at the lower end portion of the cap 55 opposing the permanent magnet 53.

Functions and effects of the cap 55 will be described below.

Firstly, the cap 55 functions as a weight. When a weight is added to the permanent magnet 53 to set a desired weight W, a component of force $W\sin\alpha$ for moving the permanent magnet 53 along the tilted bottom surface when the case 51 is tilted at an angle $\alpha$ is also increased. Since the increased component of force can easily overcome various forces for blocking the movement of the magnet 53, i.e., an attraction between the magnet and the lead terminals of the reed switch, the viscosity and surface tension of the magnetic fluid, and the like, the magnet can immediately respond to a tilt of the case, i.e., sensitivity can be increased.

Secondly, the magnetic fluid 54 can be saved. Most of the upper and side surfaces of the permanent magnet 53 are covered with the cap 55, and only the bottom surface and portions of the side surfaces near the bottom surface of the magnet 53 are exposed. Therefore, the magnetic fluid 54 adheres only to the exposed surfaces of the magnet 53. Since the tilt sensor of the present invention satisfactorily functions in such a condition, a required amount of magnetic fluid can be decreased.

Thirdly, assuming that the cap 55 is made of a magnetic material, the cap 55 functions as a yoke and constitutes the magnetic path of magnetic fluxes. With this arrangement, a concentrated magnetic field is formed between the lower end portion of the cap 55 and the lower pole (S pole in this case) of the permanent magnet 53. That is, leaking magnetic fluxes are greatly reduced, and the magnetic influence on the reed switch 57 is increased. In this case, if the gap 55c is formed at the lower end portion of the cap 55, magnetic fluxes directly flowing from the cap 55 to the permanent magnet 53 are decreased, and magnetic fluxes flowing to the S pole through the space are increased. As a result, magnetic fluxes can be effectively used.

Figure 10:
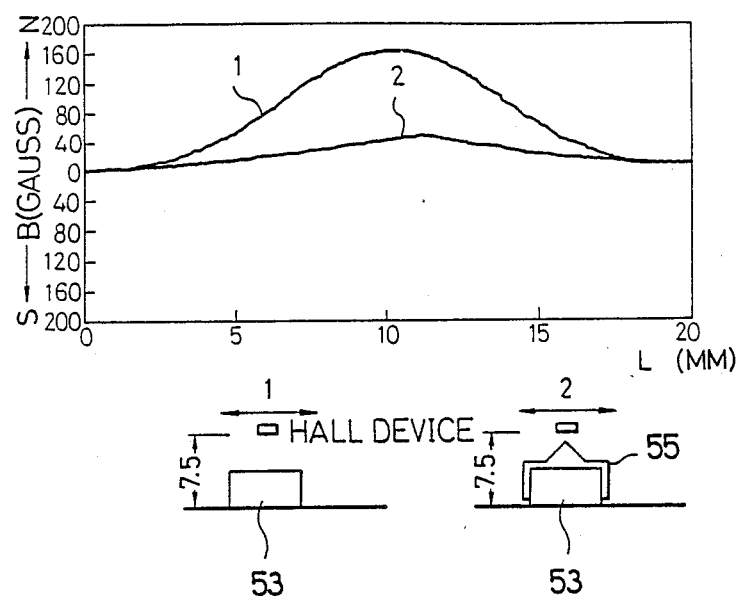
FIGS. 10 and 11 are graphs respectively showing intensities of an external magnetic field with and without the cap.
Figure 11:
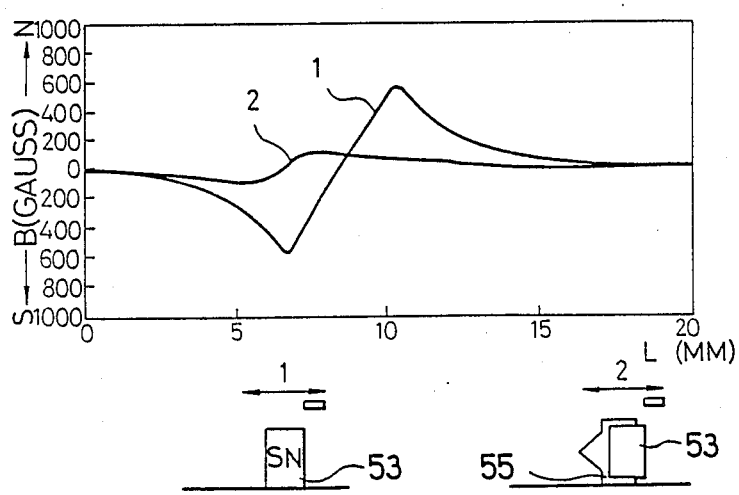

FIGS. 10 and 11 show results obtained by measuring intensities of magnetic fields above (FIG. 10) and at a side (FIG. 11) of the permanent magnet 53 with and without the cap 55. It is apparent from FIGS. 10 and 11 that leaking magnetic fluxes are greatly reduced by covering the magnet with the cap.

Note that the conical projection 55a formed on the top of the cap 55 is brought into contact with the inner surface of the cover 51b of the case 51 so as to prevent the permanent magnet 53 and the cap 55 from being toppled or upset, and to prevent the cap 55 from being brought into contact with the inner surface of the cover 51b.

Referring to FIG. 9, a distance H from the bottom surface of the case 51 to a lead terminal 57a of the reed switch 57 influences the sensitivity of the tilt sensor or a tilt angle at which the reed switch responds with high sensitivity. Therefore, by adjusting the distance H, the sensitivity and the response angle can be adjusted. In the conventional technique, threads are formed in the outer circumferential surface of a hold member for holding the reed switch and in the inner circumferential surface of the mounting base which is brought into contact with the hold member so as to be meshed with each other, and the hold member is pivoted to be vertically moved, thereby performing the adjustment. In this embodiment, the outer circumferential surface of the switch holder 58 and the inner circumferential surface of the mounting base 56 have sizes to be fitted, and a groove 58a is formed in the switch holder 58 in its circumferential direction. In addition, an adjustment window 56a is formed in a body portion of the mounting base 56, as shown in FIG. 7B. With this arrangement, after the distance H is adjusted by hooking a pin or the like on the groove 58a through the window and vertically moving the switch holder 58, the switch holder 58 is fusion-bonded and fixed to the mounting base 56 through a hole 56b formed in the body portion of the mounting base 56.

According to the tilt sensor of the present invention, influences of an external magnetic field must be minimized. At the same time, it is preferable to prevent magnetic influences on surroundings due to leaking magnetic fluxes. In this embodiment, therefore, the shield case 64 is fitted on the mounting base 56 from above so as to cover the entire case 51. The shield plate 65 is arranged on the bottom portion of the mounting base 56 so as to cover the lower portion of the reed switch 57. In addition to a magnetic shield, the shield case 64 functions as a means for fixing the aluminum case 51 to the mounting base 56. A hole 64a portion is finally fixed to the mounting base 56 by fusion bonding. The shield plate 65 is fixed to the mounting base 56 through the holes 65a.

Figure 12:
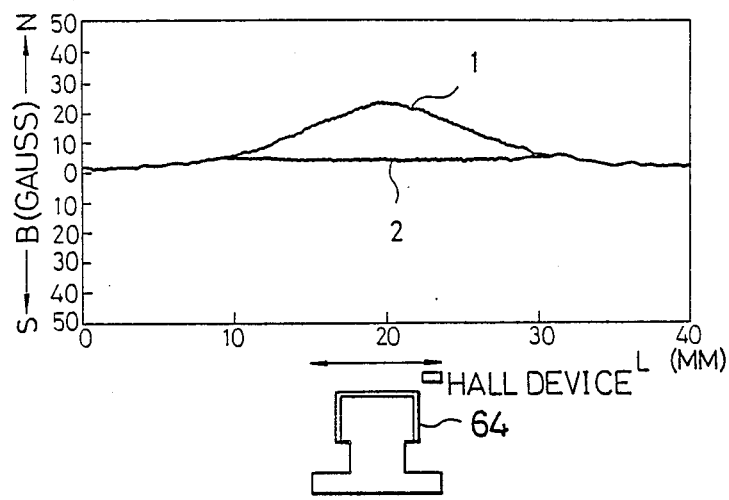
FIG. 12 is a graph showing intensities of an external magnetic field with and without a shield case.

FIG. 12 shows intensities of magnetic fields measured in cases where the shield case 64 is present (resin case plated with Fe+Ni) and not present (Al case), respectively. Curves ① and ② in FIG. 12 respectively represent measurement results in the cases wherein the shield case 64 is and is not present.

Figure 13:
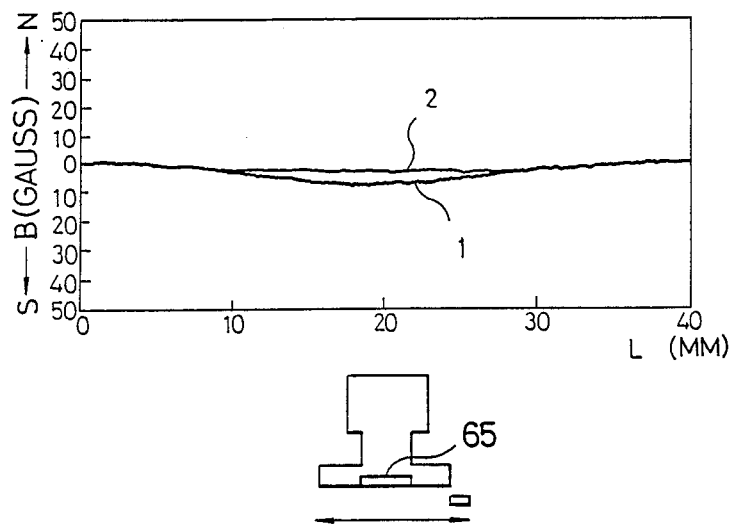
FIG. 13 is a graph showing intensities of an external magnetic field with and without a shield plate.

FIG. 13 shows intensities of magnetic fields measured in cases wherein the shield plate 65 is present (resin plate plated with Fe+Ni) and not present (Al plate), respectively. Curves ① and ② in FIG. 13 respectively represent measurement results in the cases wherein the shield plate 65 is and is not present. It is apparent from these results that leaking magnetic fluxes are greatly decreased when the shield case 64 and the shield plate 65 are present.

Figure 14:
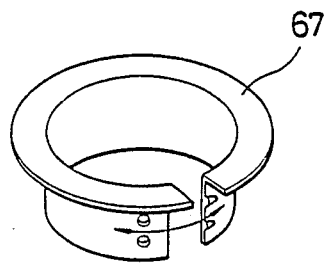
FIG. 14 is a perspective view of a shield band.
Figure 15:
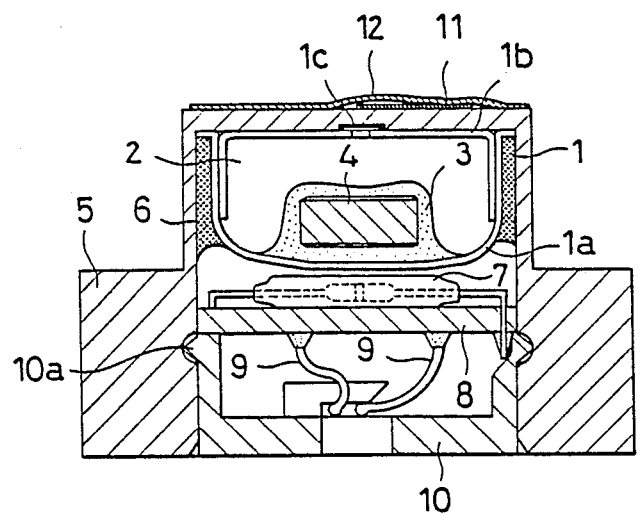
FIG. 15 is a sectional view showing a conventional magnetic tilt sensor corresponding to FIGS. 1A and 1B.

In order to further improve the magnetic shield effect, a shield band 67 is fitted on a side portion of the mounting base adjacent to the switch holder 58, as shown in FIG. 14. With this arrangement, a perfect shield effect can be obtained. This shield band 67 is made of, e.g., a soft magnetic material. A portion of the shield band 67 is cut off. After the shield band 67 is fitted on the side portion of the mounting base by spreading both the ends of the band 67, the ends are locked to each other.

Instead of using the resin molded member plated with a magnetic metal and the soft magnetic material as the shield member as described above, a molded member obtained by mixing flakes of iron, ferrite, amorphous metal, and the like with a resin may be used as a shield material. For example, the mounting base may be constituted by a molded member of this type.

As described above, according to the embodiment, when the cap is covered on the permanent magnet housed in the case, a necessary weight is added to the magnet. As a result, a component of force for moving the permanent magnet along the bottom surface when the case is tilted is increased, and the magnet can quickly respond to a tilt or vibrations of the case, thereby increasing the sensitivity of the tilt sensor.

Since the magnetic fluid adheres only to an exposed portion of the permanent magnet and does not adhere to an unnecessary portion unlike in the conventional technique, a required amount of magnetic fluid can be reduced. As a result, the cost can be decreased.

In addition, if the cap is constituted by a magnetic member, the cap functions as a yoke. As a result, a magnetic field is concentrated between the lower end portion of the cap and the bottom portion of the permanent magnet. Therefore, leaking magnetic fluxes can be minimized, and magnetic influences on the reed switch are increased. As a result, the size of the tilt sensor can be reduced.

Furthermore, the outer circumferential surface of the hold member for holding the magnetic sensing element and the inner circumferential surface of the mounting base have sizes to allow fitting and sliding movement between the two members, the groove is formed in the hold member in its circumferential direction, and the adjustment window is formed in the body portion of the mounting base. With this arrangement, the hold member is vertically moved by inserting a pin or the like through the adjustment window so as to adjust a distance between the hold member and the case housing the permanent magnet. As a result, the manufacturing cost can be decreased compared with the conventional thread arrangement. In addition, fixing of the hold member upon adjustment can be easily performed by fusion bonding without using a screw and the like.

Moreover, the tilt sensor is magnetically shielded from its surroundings. This arrangement can prevent an internal magnetic field from leaking out, and can block influences of an external magnetic field on the tilt sensor. Therefore, no limitation is posed in terms of an installation place of the tilt sensor, and its detection precision can be increased.

What is claimed is:

1. A magnetic tilt sensor comprising a nonmagnetic case having a hollow portion sealed by a cup-like case main body and a cover, a permanent magnet housed in the hollow portion and having a surface coated with a magnetic fluid, and a magnetic sensing element, arranged outside a bottom portion of said case, for detecting magnetism of said permanent magnet, wherein a nonmagnetic metal which can be processed by cold welding is used as said nonmagnetic case, said cup-like case main body includes a flange extending outward from an opening edge thereof, said cover includes a ring-like bent protrusion formed along an inner wall of the opening of said cup-like case and having a U-shaped section, and a flange extending outward from said protrusion, and said cup-like case main body and said cover are welded to each other at both said flanges by cold welding.

2. A magnetic tilt sensor comprising a nonmagnetic case having a hollow portion sealed by a cup-like case main body and a cover, a permanent magnet housed in the hollow portion and having a surface coated with a magnetic fluid, a magnetic sensing element, arranged outside a bottom portion of said case, for detecting magnetism of said permanent magnet, and a mounting base for holding said nonmagnetic case and said magnetic sensing element, wherein said nonmagnetic case includes a flange on the same plane as that of said cover, said mounting base includes a mounting portion having upper and lower openings communicating with each other, said nonmagnetic case is inserted from an upper portion of said mounting portion, and said flange of said nonmagnetic case is placed on a step formed near an upper edge portion of said mounting portion so as to perform positioning of said nonmagnetic case.

3. A sensor according to claim 2, wherein said mounting base has a recess formed in an upper edge portion of said mounting portion, with which a positioning projection, which is formed on an outer periphery of a label plate which is bonded to an upper surface of said nonmagnetic case through an intermediate cover, is engaged.

4. A sensor according to claim 2, wherein said mounting base includes a notched portion in a lower side wall of said mounting portion, a lead extracted from said magnetic sensing element is covered with a heat-shrinkable tube at a proper position thereof, and said heat-shrinkable tube is pushed into said notched portion and is fixed thereto.

5. A sensor according to claim 2, wherein said mounting base includes mounting screw holes, formed in both end portions thereof in a longitudinal direction thereof, for mounting said tilt sensor on an object, and each of said mounting screw holes has large- and small-diameter portions constituting a two-stage shape.

6. A sensor according to claim 2, wherein bottom surfaces of both of said end portions in the longitudinal direction of said mounting base extend slightly farther than a bottom surface of an intermediate portion of said mounting base, and said tilt sensor is set to be horizontal by the bottom surfaces of both of said end portions.

7. A magnetic tilt sensor comprising a nonmagnetic case, a permanent magnet movably housed in said case, a magnetic fluid adhering to at least a portion of said permanent magnet, which is located between said permanent magnet and a bottom surface of said case, and a magnetic sensing element, arranged and fixed outside a bottom portion of said case, for detecting magnetism of said permanent magnet, wherein a cap having a predetermined weight covers said permanent magnet.

8. A sensor according to claim 7, wherein said cap comprises a magnetic member and has a shape covering most of portions from an upper surface to side surface portions near a bottom surface of said permanent magnet.

9. A magnetic tilt sensor comprising a nonmagnetic case, a permanent magnet movably housed in said case, a magnetic fluid adhering to at least a portion of said permanent magnet, which is located between said permanent magnet and a bottom surface of said case, a magnetic sensing element, arranged and fixed outside a bottom portion of said case, for detecting magnetism of said permanent magnet, a hold member for holding said magnetic sensing element, and a mounting base on which said case and said hold member are mounted, wherein an outer circumferential surface of said hold member and an inner circumference surface of said mounting base have sizes to allow fitting and sliding movement between said hold member and said mounting base, a groove is formed in said hold member in a circumferential direction thereof, an adjustment window is formed in a body portion of said mounting base, and said hold member is moved through said adjustment window so as to adjust a distance between said hold member and said case.

10. A magnetic tilt sensor comprising a nonmagnetic case, a permanent magnet movably housed in said case, a magnetic fluid adhering to at least a portion of said permanent magnet, which is located between said permanent magnet and a bottom surface of said case, and a magnetic sensing element, arranged outside a bottom portion of said case, for detecting magnetism of said permanent magnet, a hold member for holding said magnetic sensing element, wherein a magnetic shield is arranged so as to prevent leakage of a magnetic flux from said magnet and to prevent an external magnetic field from influencing the inside of said tilt sensor.

* * * * *